Nov. 14, 1933.   J. PIOTROWSKI   1,935,521
ANTISHIMMY DEVICE
Filed Feb. 4, 1932
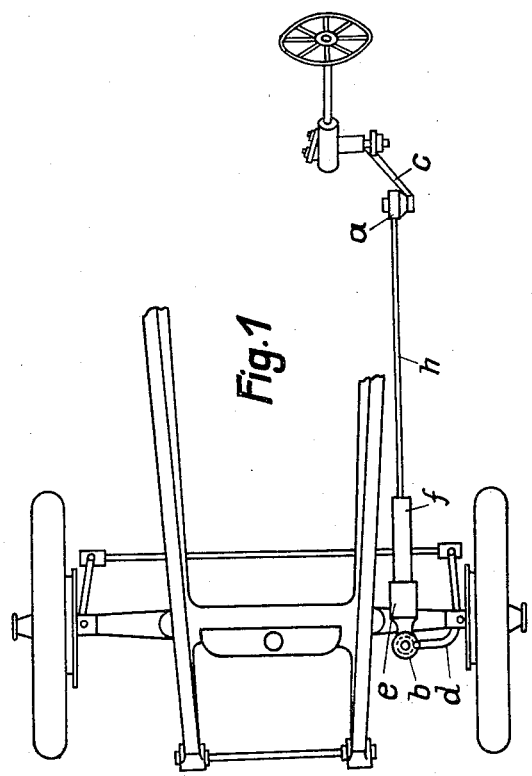
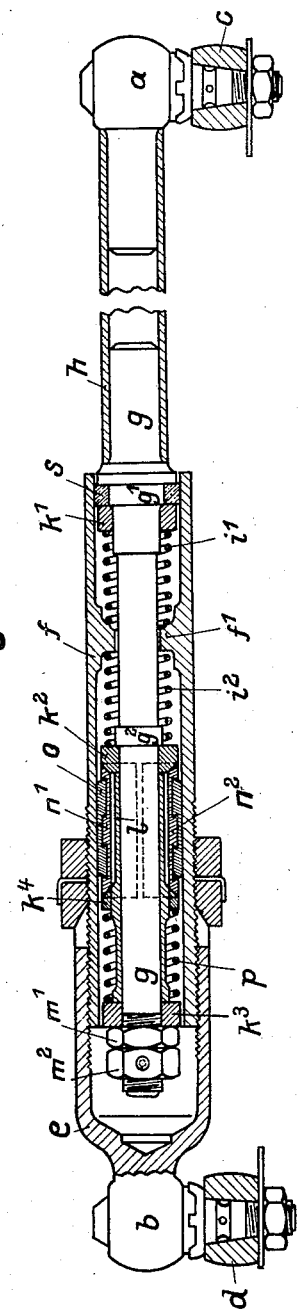
Inventor
Johannes Piotrowski
By Watson E. Coleman
Attorney Patented Nov. 14, 1933

1,935,521

UNITED STATES PATENT OFFICE 1,935,521

ANTISHIMMY DEVICE

Johannes Piotrowski, Berlin-Wilmersdorf, Germany, assignor to firm Auto-Product G. m. b. H., Berlin-Halensee, Germany Application February 4, 1932. Serial No. 590,963, and in Germany April 23, 1931

11 Claims. (Cl. 280—87)

This invention relates to a device for damping wobble or shimmy of the front wheels of motor vehicles with one or more braking devices which impede relative movements of parts of the steering mechanism operatively connected with the front wheels.

In certain known constructions for this purpose the braking devices are indirectly connected, for example through the medium of links and levers, with the parts of the steering mechanism to be braked. With this arrangement there is experienced the drawback that, in consequence of the unavoidable play in the connecting joints and the like, with slight wobble or shimmy of the wheels the braking device remains inoperative. In case a condition of resonance or synchronism is set up between such shimmy movements and the vibrations of the vibratory system constituted by the wheels and the steering mechanism, it may happen, in consequence of the initial inoperativeness of the braking device, that the shimmy movements are integrated, that is increased continuously in amplitude, so that finally they are incapable of being damped to the necessary degree. A further drawback commonly experienced with known damping devices is that they comprise numerous additional fitments to be provided outside of the steering mechanism proper, whence it results that, apart from the difficulty usually present of fitting the damping device, there is experienced the further drawback that the device cannot be protected from the ingress of dust and moisture. Further, it is only seldom possible to fit to existing structures the known constructions of damping devices without extensive alteration of the existing steering mechanism.

A novel essential feature of the present invention resides in this that the braking device acting on the steering mechanism is interposed between two parts of the steering mechanism resiliently connected with one another in such wise that the braking path is constituted by the spring play between these two parts. With this arrangement the result is obtained that even with the smallest relative movement of the two resiliently connected parts of the steering mechanism the braking device is operative, so that the shimmy movements are not transmitted to the steering wheel.

This novel arrangement also renders it possible to reduce substantially the space occupied by the device and to protect the device against the ingress of dirt and moisture. Preferably, the braking device is interposed in the drag link or, between the latter and the parts of the steering mechanism connected therewith, so as to be wholly enclosed. In this case the damping device may form a unit with the drag link, so that the damping device requires no special junction connections and in case of need can be conveniently fitted by exchanging the existing drag link.

In one practical embodiment of the invention the drag link comprises two or more parts slidable telescopically one within the other against which parts abut in both directions springs or the like and between which a friction member is interposed. The friction member can be readily so arranged as to be entirely enclosed. As one or more of the telescopically movable parts of the drag link can be utilized to present a sliding surface to the friction member, the drag link together with the damping device is given an extremely compact form.

The friction member may consist for example of a segmental sleeve presenting friction faces, the ends of which sleeve abut by means of intergaging coned surfaces against that part of the drag link presenting a sliding surface for the friction faces and against a ring or the like slidable independently of both parts of the drag link and subject to the action of a spring. Depending on the wear of the friction faces the friction member is automatically enlarged or contracted under the influence of the spring-loaded ring according as the friction faces cooperate with the outer or the inner one of the telescopic parts of the drag link. As the frictional resistance depends on the pressure of the friction faces against the sliding surface, the frictional resistance can be simply adjusted in accordance with the requirements by suitable selection of the conicity of the abutment faces for the friction member, or by using a more or less powerful loading spring for the ring serving as an abutment for one end of the member. A valuable property of this arrangement is that shimmy movements of even the smallest amplitude can be very effectively damped so that the possibility of enlarging the amplitude of the vibrations in consequence of synchronism is suppressed.

In order to permit extremely simple and cheap production of the combined drag link and damping device, the arrangement is preferably such that on the inner one of the telescopically fitted parts of the drag link there is held in position between a sleeve strung thereon and a collar on the inner part a ring presenting a conical abutment face for one female conical end of the friction member, the said sleeve serving as a sliding guide for a movable spring-loaded ring presenting a conical abutment face for the other female conical end of the friction member.

Naturally, instead of the friction arrangement described between the telescopically fitted parts of the steering push rod, other damping means may be employed. For example, there may be provided several friction members formed as flat tongues and arranged in a cavity in the drag link. Also a hydraulic braking device would be suitable for the present purpose. Simple fitting of such a hydraulic braking device could be effected for example by utilizing the outer tubular part of the drag link as a brake cylinder and the inner part as a brake piston.

An embodiment of the invention is illustrated in the accompanying drawing in which Fig. 1 is a diagrammatic plan showing the front part of the vehicle chassis including the front wheels and steering mechanism. Fig. 2 is an axial section of the drag link to a larger scale.

The drag link which, by means of ball joints $a$ and $b$ is connected at one end to the drop arm $c$ actuated by the steering hand-wheel and at the other end to the steering arm $d$ fixedly connected with the stub axle of one front wheel, comprises the following parts: a cap $e$ provided with an internal screw-thread and unitary with the socket for the ball joint $b$, a tube $f$ screwed into the cap $e$, a rod $g$ extending axially through the tube $f$, and a tube $h$ which is interposed between the rod $g$ and the socket for the ball joint $a$; the tube $h$ being secured at one end to the outer end of the rod $g$ and carrying at its other end the socket for the ball joint $a$. The rod $g$ is slidable in the tube $f$ in both directions against the action of two helical compression springs $j^1$ and $j^2$. These springs abut at their adjacent ends against an inwardly projecting ledge $f'$ of the tube $f$ and at their opposite ends on springs $k^1$, $k^2$ on the rod $g$. The ring $k^1$ is held in position against the effort of the spring $j^1$ by a collar $g^1$, while the ring $k^2$ is located between a collar $g^2$ on the rod $g$ and one end of a sleeve $l$ embracing the rod $g$. The other end of the sleeve $l$ abuts against a ring $k^3$ fitted on the rod $g$ and held in position by means of nuts $m^1$, $m^2$ threaded on the end of the rod $g$ located in the cap $e$. On the collar $g^1$ there is mounted a packing ring $s$ of felt or other suitable material which engages the inner periphery of the tube $f$. Between the ring $k^2$ and an additional ring $k^4$ slidable on the sleeve $l$ there is located a friction member which consists of a segmental sleeve including segments $n^1$, $n^2$ ... provided on their outer faces with renewable friction facings $o$ which may consist for example of Ferodo linings, asbestos or similar materials. These friction facings $o$ are in contact with the inner periphery of the tube $f$. The interengaging faces of the rings $k^2$ and $k^4$ and of the segments $n^1$, $n^2$ are of conical form. The ring $k^4$ is subject to the action of a spring $p$ which abuts against the ring $k^3$. With this arrangement the result is obtained that on account of its shape, and notwithstanding wear, the friction facing is continuously pressed against the periphery of the tube. According to the pressure desired the conicity of the rings $k^2$ and $k^4$ and of the segments $n^1$, $n^2$ ... may be less or greater.

By the use of such a drag link shimmy movements of the front wheels are damped by reason that the link $g$ slides with the friction facing in the tube $f$.

Instead of a friction member consisting of several segments there may be used a unitary sleeve slotted from one end.

What I claim as my invention and desire to secure by Letters Patent of the United States of America, is:—

1. A device for damping shimmy or wobble of the front wheels of motor vehicles, comprising, in combination, a steering mechanism including a drag link, said drag link consisting of telescopically fitted parts, springs disposed within said telescopically fitted parts and whereby a resiliency is imparted to said telescopically fitted parts, and at least one friction member arranged within and between said telescopically fitted parts in such a manner that the braking path of said friction member coincides with the path of resiliency between said telescopically fitted parts.

2. A device as claimed in claim 1, wherein said friction member consists of a segmental sleeve and of segments provided with friction faces.

3. A device for damping shimmy or wobble of the front wheels of motor vehicles, comprising, in combination, a steering mechanism including a drag link, said drag link consisting of telescopically fitted parts, springs disposed within said telescopically fitted parts and whereby a resiliency is imparted to said telescopically fitted parts, at least one friction member internally mounted between said telescopically fitted parts, said friction member consisting of a segmental sleeve a number of segments engaging one of said telescopically fitted parts by means of inter-engaging male and female conical faces, and friction members disposed on the circumferential faces of said segments.

4. A device for damping shimmy or wobble of the front wheels of motor vehicles, comprising, in combination, a steering mechanism including a drag link, and a frictionally acting braking device expansible to take up wear and adapted to impede relative movements of parts of the said steering mechanism, said braking device being mounted within said drag link, said drag link being rendered resilient, the path of resiliency of said drag link coinciding with the braking path of said friction device, whereby the least movement of resiliency is damped by said braking device.

5. A device for damping shimmy or wobble of the front wheels of motor vehicles, comprising, in combination, a steering mechanism including a drag link, said drag link consisting of telescopically fitted parts, springs disposed within said telescopically fitted parts and whereby a resiliency is imparted to said telescopically fitted parts, at least one friction member internally mounted between said telescopically fitted parts, said friction member consisting of a segmental sleeve a number of segments engaging one of said telescopically fitted parts by means of interengaging male and female conical faces, and friction members disposed on the circumferential faces of said segments, and a spring interposed between said friction member and one of said telescopically fitted parts, whereby a resilient coupling is obtained between said member and said respective part in one direction of movement of said respective part.

6. A drag link connection between a steering arm and stub axle arm formed of two telescopic sections, means resiliently resisting longitudinal movement of the sections relative to each other, and expansible means carried by one section and frictionally bearing against the other section to thus frictionally resist movement of the sections.

7. A drag link connection between a steering arm and a stub axle including two interengaging sections, means resiliently resisting relative longitudinal movement of the two sections on each other, and expansible means carried by one section and frictionally bearing against the confronting face of the other section, and frictionally resisting relative movement of the sections.

8. A drag link connection between a steering arm and a stub axle formed of two telescopic sections, means resiliently resisting longitudinal movement of the sections relative to each other and expansible to take up wear, means carried by one section and frictionally bearing against the other section, and means for causing the frictional engagement between the two sections to be in proportion to the force exerted to relatively move these sections.

9. A drag link connection between a steering arm and a stub axle arm formed of two telescopic sections, means for resiliently resisting longitudinal movement of the two sections, and means expansible to take up wear and disposed entirely within the outer section for damping said relative movements.

10. A drag link connection between a steering arm and a stub axle arm including an outer section and an inner section having telescopic engagement with the outer section, means disposed within the outer section resiliently resisting relative longitudinal movement of the sections, and means disposed between the two sections for frictionally engaging the sections with each other and expansible to take up wear.

11. A device for damping shimmy or wobble of the front wheels of motor vehicles comprising in combination a steering mechanism including a drag link and a frictional braking device adapted to impede relative movements of the parts of said steering mechanism, said drag link consisting of telescopically fitted parts, resilient means yieldingly resisting relative longitudinal movement of the parts and disposed concentrically to the longitudinal axis of the said parts, and braking means carried upon one of said parts and confronting the other of said parts and having a relatively large area of frictional engagement, the surfaces and frictional engagement being concentric to the longitudinal axis of the two parts and to the axis of the resilient means.

JOHANNES PIOTROWSKI.